United States Patent [19]

Sugimoto et al.

[11] Patent Number: 4,885,520

[45] Date of Patent: Dec. 5, 1989

[54] INDUCTION MOTOR CONTROLLER

[75] Inventors: Hidehiko Sugimoto; Shinzo Tamai, both of Hyogo, Japan

[73] Assignee: Mitsubishi Denki Kabushiki Kaisha, Tokyo, Japan

[21] Appl. No.: 228,508

[22] Filed: Aug. 5, 1988

[30] Foreign Application Priority Data

Aug. 8, 1987 [JP] Japan ................. 62-198570

[51] Int. Cl.$^4$ .............................................. H02P 5/40
[52] U.S. Cl. ....................................... 318/808; 318/805
[58] Field of Search .................. 318/803, 805, 807–811

[56] References Cited

U.S. PATENT DOCUMENTS

| | | | |
|---|---|---|---|
| 3,593,083 | 7/1971 | Blaschke | 318/803 |
| 3,909,687 | 9/1975 | Abbondanti | 318/805 |
| 4,338,559 | 7/1982 | Blaschke et al. | |
| 4,484,128 | 11/1984 | Jotten et al. | 318/805 |
| 4,503,375 | 3/1985 | Okuyama | 318/808 |
| 4,503,376 | 3/1985 | Okuyama | 318/808 |
| 4,555,755 | 11/1985 | Kurosawa et al. | 318/807 |

OTHER PUBLICATIONS

Okuyama et al., "A High Performance Speed Control Scheme of Induction Motor Without Speed and Voltage Sensors," IEEE Industry Application Society Annual Meeting, pp. 106–111.

Primary Examiner—David Smith, Jr.
Attorney, Agent, or Firm—Bernard, Rothwell & Brown

[57] ABSTRACT

In an induction motor controller, for the amount equivalent to the secondary interlinkage flux computed by use of a component of lag of first order based on the search coil voltage or the primary voltage of the induction motor, an error with respect to the actual secondary interlinkage flux is increased in a low-speed range. However, since an estimated amount equivalent to the secondary interlinkage flux computed based on the estimated amount of the secondary interlinkage flux is also attended with the same error with respect to the secondary interlinkage flux, when the former is substracted from the latter, there only remains a term concerning the speed estimation error, which enables an estimation of the speed to be conducted also in the low-speed range. Furthermore, since the time constant of the component associated with the lag of first order is varied depending on the primary angular frequency, dumping is fixedly developed for the amount equivalent to the secondary interlinkage flux, and as a result, the speed identification characteristic is fixed regardless of the high-speed and low-speed operations of the induction motor.

4 Claims, 7 Drawing Sheets

INDUCTION MOTOR CONTROLLER

BACKGROUND OF THE INVENTION

1. Field of the Invention

The present invention relates to a vector controller of an induction motor, and in particular, to an induction motor controller capable of detecting a speed without connecting a mechanical speed detector or a position detector to the induction motor.

2. Description of the Prior Art

Figure 1:
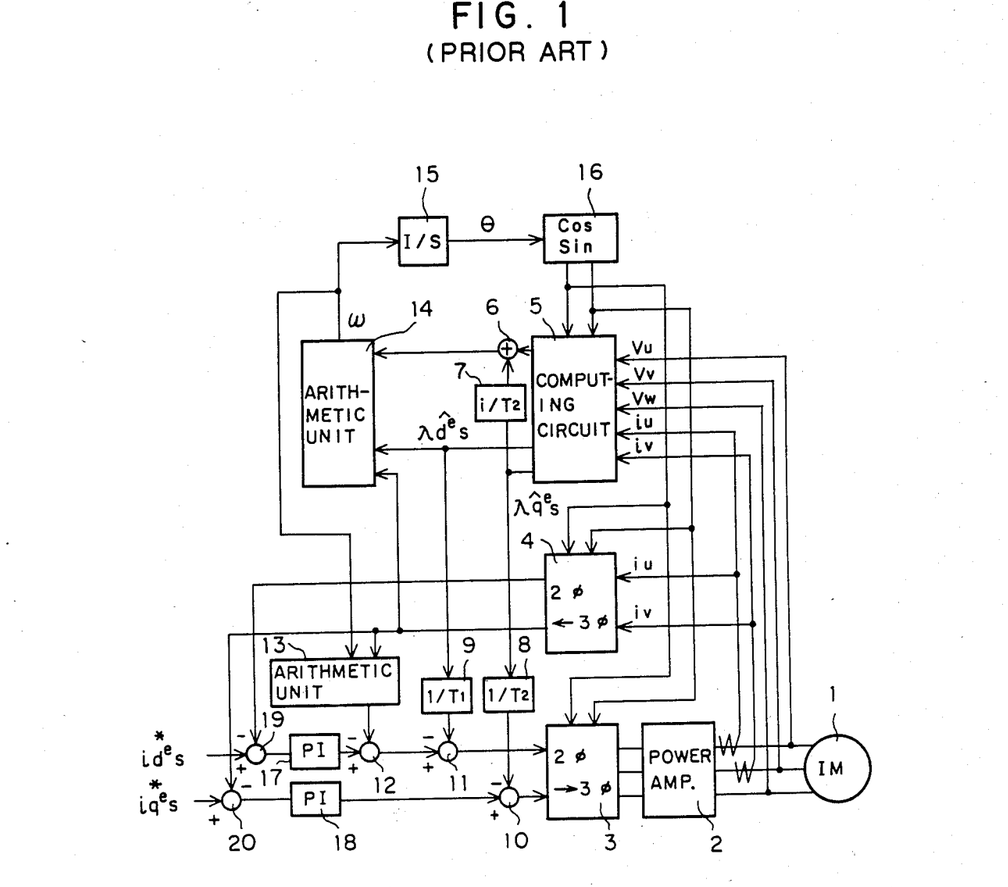
FIG. 1 is a block connection diagram showing a conventional induction motor controller.

FIG. 1 is a block diagram showing a conventional induction motor controller, for example, described in the "Induction Motor Control Method employing Slip Frequency Control Type without Speed Detector", the Institute of Electrical Engineers of Japan, Proceedings of Semiconductor Power Conversion Meeting (SPC-84-61). The configuration of FIG. 1 includes an induction motor 1, a three phase power amplifier 2, and a coordinate converter 3 for converting voltage instructions Vd$^e$s* and Vq$^e$s* into a three phase voltage whose angular frequency is $\omega$. The power amplifier 2 and the coordinate converter 3 constitute a power supply unit. The system further comprises a coordinate converter 4 for converting an alternating current into a direct current viewed on orthogonal coordinate axes (d$^e$ axis and q$^e$ axis) rotating at an angular frequency $\omega$, a circuit 5 for computing from the alternating current the primary interlinkage flux $\lambda$d$^e$s*, $\lambda$q$^e$s* and the primary voltage Vq$^e$s on the q$^e$ axis, an adder 6, constant multipliers 7 to 9, subtractors 10 to 12, an arithmetic unit 13 for removing an interference from the quantity of state on the q$^e$ axis onto the d$^e$ axis, an arithmetic unit 14 for computing the primary angular frequency $\omega$, an integrator 15, a trigonometric function generator 16, PI compensators 17 and 18, and subtractors 19 and 20.

Next, the operation will be described. The induction motor 1 is driven by the three phase power amplifier 2. The equation of the induction motor 1 is expressed as follows.

$$\begin{pmatrix} Vd^es \\ Vq^es \\ 0 \\ 0 \end{pmatrix} = \begin{pmatrix} R_s + P\sigma L_s & -\omega\sigma L_s & PM/L_r & -\omega M/L_r \\ \omega\sigma L_s & R_s + P\sigma L_s & \omega M/L_r & PM/L_r \\ -R_rM/L_r & 0 & P + R_r/L_r & -(\omega - p\omega r) \\ 0 & -R_rM/L_r & \omega - p\omega r & P + R_r/L_r \end{pmatrix} \begin{pmatrix} id^es \\ iq^es \\ \lambda d^er \\ \lambda q^er \end{pmatrix} \quad (1)$$

In this equation, $R_s$ and $R_r$ respectively indicate a primary resistance and a secondary resistance, $L_s$, $L_r$, and M respectively represent a primary inductance, a secondary inductance, and a mutual inductance, $\sigma$ stands for a leakage coefficient, p is a number of pole pairs, P=d/dt is a differential operator, Vd$^e$s and Vq$^e$s respectively are primary voltages for the d$^e$ and q$^e$ axes, id$^e$s and iq$^e$s respectively designate primary currents for the d$^e$ and q$^e$ axes, $\lambda$d$^e$r and $\lambda$q$^e$r respectively are secondary interlinkage flux for the d$^e$ and q$^e$ axes, $\omega_r$ stands for an angular velocity of a rotor, and $\omega$ is a primary angular frequency.

In the vector control, the coordinate axes d$^e$ and q$^e$ are required to be controlled so as to develop $\lambda$q$^e$r=0. For this purpose, the control equation concerning Vd$^e$s, Vq$^e$s, and $\omega$ is obtained as follows.

Expression (2) is attained by transforming the first and second rows of the expression (1).

$$P\begin{bmatrix} \lambda d^es \\ \lambda q^es \end{bmatrix} = \begin{bmatrix} 0 & \omega \\ -\omega & 0 \end{bmatrix}\begin{bmatrix} \lambda d^es \\ \lambda q^es \end{bmatrix} + \begin{bmatrix} Vd^es - R_s id^es \\ Vq^es - R_s iq^es \end{bmatrix} \quad (2)$$

Where, $\lambda d^es = \sigma L_s id^es + M\lambda d^er/L_r$ and $\lambda q^es = \sigma L_s iq^es + M\lambda q^er/L_r$ are the primary interlinkage flux with respect to the axes d$^e$ and q$^e$. Assuming that the fluxes $\lambda d^es$ and $\lambda q^es$ are detected, when Vd$^e$s and Vq$^e$s are represented as follows, $$\begin{cases} Vd^es = V'd^es - \lambda d^es/T_1 \\ Vq^es = V'q^es - \lambda q^es/T_2 \end{cases} \quad (3)$$

expression (4) is obtained.

$$P\begin{bmatrix} \lambda d^es \\ \lambda q^es \end{bmatrix} = \begin{bmatrix} -1/T_1 & \omega \\ -\omega & -1/T_2 \end{bmatrix}\begin{bmatrix} \lambda d^es \\ \lambda q^es \end{bmatrix} + \begin{bmatrix} V'd^es - R_s id^es \\ V'q^es - R_s iq^es \end{bmatrix} \quad (4)$$

Controlling $\omega$ by use of expression (5), the second row of the expression (4) is reduced to expression (6).

$$\omega = \frac{V'q^es - \{(p + 1/T_2)\sigma L_s + R_s\}iq^es}{\lambda d^es} \quad (5)$$

$$(p + 1/T_2)\lambda q^er = 0 \quad (6)$$

From the expression (6), it is clear that $\lambda q^er$ converges to 0 under a condition $T_2 > 0$.

As described above, when $\lambda d^es$ and $\lambda q^es$ are detected to accomplish the control according to the expressions (3) and (5), the vector control of the induction motor can be effected without using a speed detector. That is, the control of the expression (3) is achieved by use of the constant multipliers 8 and 9 and the control of the expression (5) is carried out with the arithmetic unit 14 associated with the primary angular frequency $\omega$. In addition, the primary angular frequency $\omega$ outputted from the arithmetic unit 14 is integrated by the integrator 15 to attain a phase signal such that the trigonometric wave generator 16 receiving the phase signal outputs the sine and cosine values thereof.

Furthermore, in the expression (1), in order to remove the interference component from the q$^e$ axis onto the d$^e$ axis, the arithmetic units 13 and 14 achieved a control according to $$V'd^es = V''d^es - \omega\sigma L_s iq^es \quad (7)$$

The currents id$^e$s and iq$^e$s associated with the d$^e$ and q$^e$ axes are subjected to a feedback control by means of the PI compensator 17 and the subtractor 19 and the PI compensator 18 and the subtractor 20, respectively.

Figure 2:
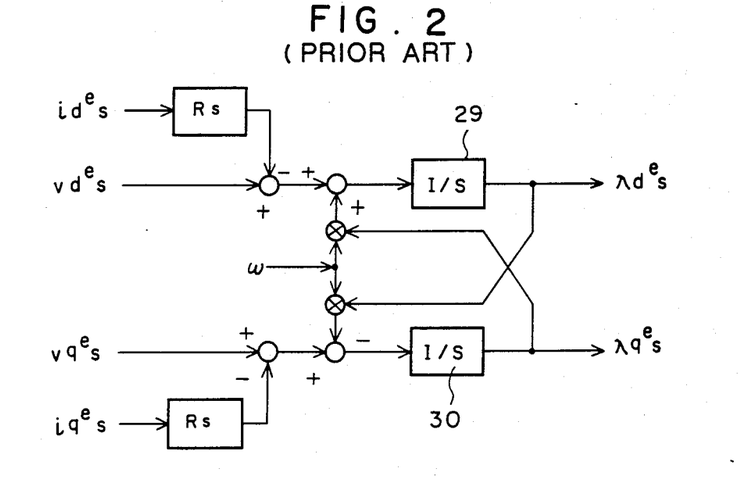
FIGS. 2 and 3 are block connection diagrams showing a detection method of detecting the primary interlinkage flux in the configuration of FIG. 1.
Figure 3:
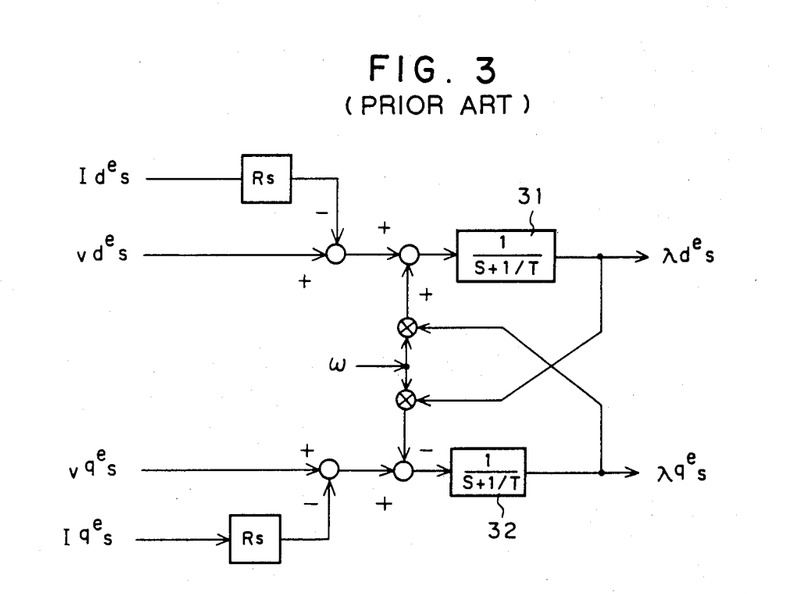

The primary interlinkage fluxes $\lambda d^es$ and $\lambda q^es$ for the d$^e$ and q$^e$ axes are detected according to the expression (2). The block diagram of this detection method is, for example, as shown in FIG. 2 in which integrators 29 and 30 are required and a complete integrator cannot be implemented; consequently, a primary delay filter of a time lag of first order is employed therefor as shown in FIG. 3.

Since the conventional induction motor controller not using a speed detector is constituted as described above, the operation accuracy of $\lambda d^e s$ and $\lambda q^e s$ is deteriorated particularly in the low-speed region due to the utilization of the filter of the time lag of first order, which leads to the occurrence of estimation resulting error of $\omega$ and the error in the generated torque.

SUMMARY OF THE INVENTION

It is therefore an object of the present invention to provide an induction motor controller capable of estimating a speed of the motor in principle without error even in a low-speed range, thereby solving the problems above.

In the induction motor controller according to the present invention, from a voltage and a current of the motor, there are computed an amount equivalent to a secondary interlinkage flux by use of a first-order lag component and an estimated value of the secondary interlinkage flux equivalent amount in a state of the motor having undergone a vector control based on the current thereof so as to obtain an estimated value of the motor speed for which the difference between the estimated value and the equivalent amount is set to 0; thereafter, an estimated value of a slip frequency is computed from the estimated value of the motor speed and the current so as to attain the primary frequency of the motor.

In addition, the induction motor controller according to the present invention is configured such that the time constant of the first-order delay component is varied according to the primary angular frequency.

Above and other advantageous features of the present invention will become apparent from the following detailed description taken in conjunction with the accompanying drawings.

DETAILED DESCRIPTION OF THE PREFERRED EMBODIMENTS

Referring now to the drawings, description will be given of an embodiment according to the present invention. The configuration of FIG. 4 includes a coordinate converter circuit 33 to effect a coordinate conversion of the primary voltage detection value, an equivalent amount compute unit 34 to compute a secondary interlinkage flux equivalent amount from the primary voltage of the motor by use of the first-order lag component, a flux/slip frequency estimate circuit 35 for estimating the secondary interlinkage flux and the slip frequency in a state where the vector control is effected, an estimation value compute unit 36 to compute an estimated value of the secondary interlinkage flux equivalent amount from the secondary interlinkage estimation value by use of the component associated with the lag of first order, a rotation angular velocity estimate unit 37 to estimate the angular velocity of the induction motor 1, and an adder 38.

Figure 4:
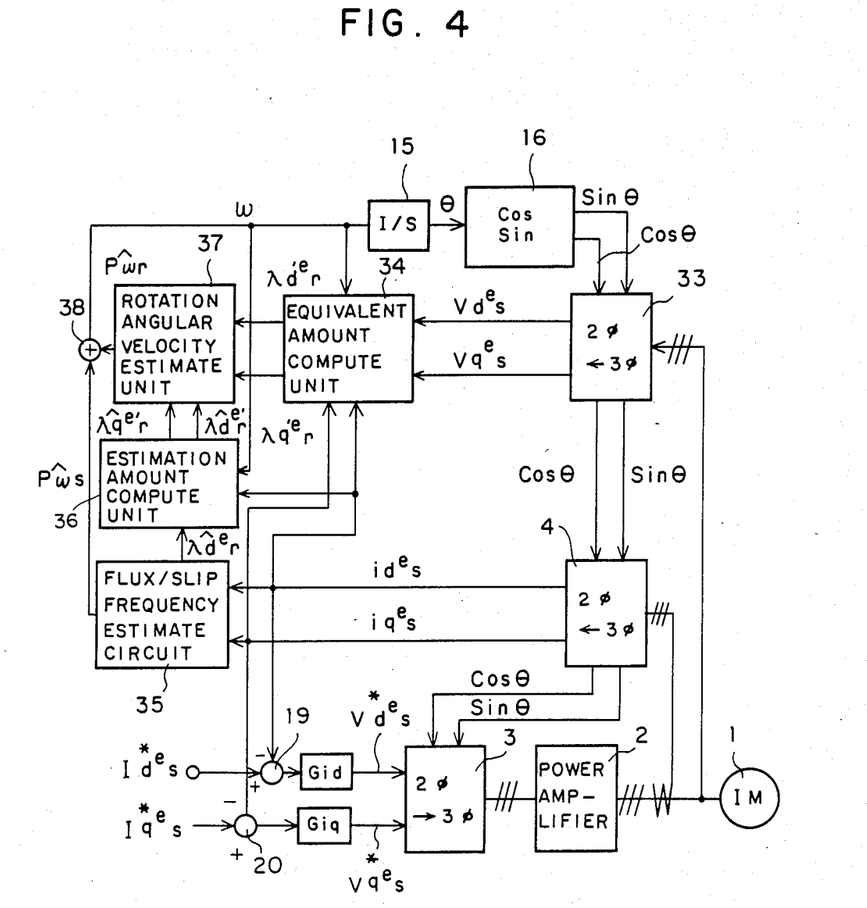
FIG. 4 is a block connection diagram showing an induction motor controller according to an embodiment of the present invention.

Incidentally, the same blocks in FIG. 1 as those shown in FIG. 4 are assigned the same reference numerals and the duplicated description thereof will be avoided.

Next, the operation will be described.

First, the primary voltages $Vd^e s$ and $Vq^e s$ associated with the $d^e$ and $q^e$ axes are expressed as follows.

$$\begin{bmatrix} Vd^e_s \\ Vq^e_s \end{bmatrix} = \frac{M}{L_r}\begin{bmatrix} p - \omega \\ \omega \quad p \end{bmatrix}\begin{bmatrix} \lambda d^e_r \\ \lambda q^e_r \end{bmatrix} + \begin{bmatrix} R_s + P\sigma L_s & -\omega\sigma L_s \\ \omega\sigma L_s & R_s + P\sigma L_s \end{bmatrix}\begin{bmatrix} id^e_s \\ iq^e_s \end{bmatrix} \quad (8)$$

In order to reversely calculate $\lambda d^e r$ and $\lambda q^e r$ by use of the expression (8), a complete integrator is necessary. To overcome this situation, a lag or delay of first order is introduced in place thereof so as to obtain expression (9).

$$\begin{bmatrix} \lambda' d^e_r \\ \lambda' q^e_r \end{bmatrix} = \begin{bmatrix} p + 1/T & -\omega \\ \omega & p + 1/T \end{bmatrix}^{-1} \cdot \quad (9)$$

$$\frac{L_r}{M}\left\{ \begin{bmatrix} Vd^e_s \\ Vq^e_s \end{bmatrix} - \begin{bmatrix} R_s + P\sigma L_s & -\omega\sigma L_s \\ \omega\sigma L_s & R_s + P\sigma L_s \end{bmatrix}\begin{bmatrix} id^e_s \\ iq^e_s \end{bmatrix} \right\}$$

Here, $\lambda' d^e r$ and $\lambda' q^e r$ are different from the secondary interlinkage flux $\lambda d^e r$ and $\lambda q^e r$ because of the difference with respect to the expression (8) and hence are called secondary interlinkage flux equivalent amount. The equivalent amount compute unit 34 is configured corresponding to the expression (9), namely, from the inputs including $Vd^e s$, $Vq^e s$, $id^e s$, and $iq^e s$, there are outputted $\lambda' d^e r$ and $\lambda' q^e r$.

In addition, the secondary interlinkage flux in a state where the vector control is effected is expressed as follows.

$$\hat{\lambda} d^e_r = \frac{MR_r/L_r}{P + R_r/L_r} id^e_s \quad (10)$$

Moreover, the secondary interlinkage flux in a state where the vector control is effected is expressed as follows.

$$\begin{bmatrix} \hat{\lambda}'d^e r \\ \hat{\lambda}'q^e r \end{bmatrix} = \begin{bmatrix} p + 1/T & -\omega \\ \omega & p + 1/T \end{bmatrix}^{-1} \begin{bmatrix} \frac{R_r}{L_r}(Mid^e s - \hat{\lambda}d^e r) \\ \omega\hat{\lambda}d^e r \end{bmatrix} \quad (11)$$

The estimation amount compute unit 36 outputs $\hat{\lambda}'d^e r$ and $\hat{\lambda}'q^e r$ based on the expression (11). The transfer functions for the respective differences between $\hat{\lambda}'d^e r$, $\hat{\lambda}'q^e r$ and $\hat{\lambda}'d^e r$, $\hat{\lambda}'q^e r$ are represented as follows.

$$\Delta\lambda'd^e r - \Delta\hat{\lambda}'d^e r = \quad (12)$$

$$\frac{(\omega_0 - p\omega_{r0})(S^2 + S/T + \omega_0^2) - \omega_0/T(S + R_r/L_r)}{\{(S + 1/T)^2 + \omega_0^2\}\{(S + R_r/L_r)^2 + (\omega_0 - p\omega_{r0})^2\}} \cdot$$

$$p(\Delta\hat{\omega}_r - \Delta\omega_r)\hat{\lambda}d^e_{r0}$$

$$\Delta\lambda'd^e r - \Delta\hat{\lambda}'q^e r = \quad (13)$$

$$\frac{(S + R_r/L_r)(S^2 + S/T + \omega_0^2) + \omega_0/T(\omega_0 - p\omega_{r0})}{\{(S + 1/T)^2 + \omega_0^2\}\{(S + R_r/L_r)^2 + (\omega_0 - p\omega_{r0})^2\}} \cdot$$

$$p(\Delta\hat{\omega}_r - \Delta\omega_r)\hat{\lambda}d^e_{r0}$$

Figure 5:
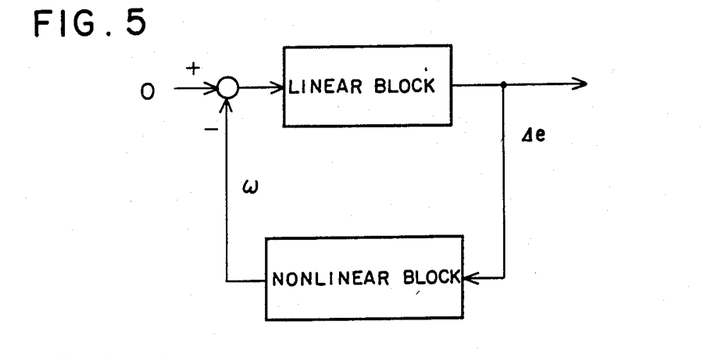
FIG. 5 is a block diagram illustrating an equivalent, nonlinear feedback system for explaining an operation to obtain a speed identification or detection algorithm.

These expressions develop a linear characteristic in the neighborhood of an operation point where the rotary speed $\omega r$ becomes identical to the estimated value $\hat{\omega}r$ thereof. An added subscript o following a symbol indicates that the value is attained at the operation point, whereas a triangle $\Delta$ designates that the value is a deviation from the operation point. According to the expressions (12) and (13), if the estimation error $(\Delta\omega r - \Delta\hat{\omega}r)$ is 0, $(\Delta\lambda'd^e r - \Delta\hat{\lambda}'d^e r)$ and $(\Delta\lambda'q^e r - \Delta\hat{\lambda}'q^e r)$ are 0; otherwise, the effect of the error appears in $(\Delta\lambda'd^e r - \Delta\hat{\lambda}'d^e r)$ and $(\Delta\lambda'q^e r - \Delta\hat{\lambda}'q^e r)$. According to a model reference adaptive system theory, the speed detector or identification unit is configured in a form of an equivalent nonlinear feedback system shown in FIG. 5 and comprises, for example, a linear block receiving an input of $-W = p(\Delta\omega_r - \Delta\hat{\omega}_r)\lambda'd^e_{r0}$ and a nonlinear block recieving an output $\Delta e$ from the linear block and including an identifying rule associated with the expressions (11) and (12). The expression of the nonlinear block is as follows with $\Delta e$ as an input.

$$W = (\Delta\hat{\omega}_r - \Delta\omega_r)p\hat{\lambda}d^e_{r0} = \quad (14)$$

$$\left\{ \int_0^t \psi(\Delta e)dt + \Delta\hat{\omega}_r(0) - \Delta\omega_r \right\} \times p\hat{\lambda}d^e_{r0}$$

Here, $\Delta e$ and $\psi(\Delta e)$ are required to be determined.

According to the Popov hyperstability theory, the conditions under which the identification unit operates in a stable state are as follows.

(1) The transfer function of the linear block takes a strictly positive real value.

(2) The input/output relationships of the nonlinear block satisfy the following expression.

$$\int_0^{t_1}(\Delta e)W \, dt \geq -r_0^2 \quad (15)$$

where, $r_0^2$ is a positive constant.

First, the condition (1) means that the vector locus or the transfer function turns at most 90°. In the expression (12), the numerator is of a degree of two and the denominator is of a degree of four, and hence the rotation angle of the vector locus exceeds 180° and the value of the transfer function is not a strictly positive real value. For the expression (13), for example, in a case of $\omega_0(\omega_0 - p\omega_{r0}) < 0$, the coefficient of the numerator may take a negative value. In such a case, the condition associated with a positive real value is not satisfied. To guarantee the condition, based on the expressions (12) and (13), $\Delta e$ is assumed as follows.

$$\Delta e = (\omega_0 - p\omega_{r0})(\Delta\lambda'd_r^e - \Delta\hat{\lambda}'d_r^e) + \quad (16)$$

$$\left(p + \frac{R_r}{L_r}\right)(\Delta\lambda'q_r^e - \Delta\hat{\lambda}'q_r^e) =$$

$$\frac{S^2 + S/T + \omega_0^2}{(S + 1/T)^2 + \omega_0^2} p(\Delta\omega_r - \Delta\hat{\omega}_r)\hat{\lambda}d^e_{r0}$$

The expression (16) takes a value of a positive real value for $\omega_0 = 0$ and a value of a strictly positive real value for $\omega_0 \neq 0$. Based on the determined $\Delta e$, the value of $\psi(\Delta e)$ is to be obtained. Let us transform the expression (15) as follows.

$$\int_0^{t_1} \Delta e \left\{ \int_0^t \psi(\Delta e)dt + \Delta\hat{\omega}_r(0) - \Delta\omega_r \right\} p\hat{\lambda}d^e_{r0} dt \geq -\gamma^2 \quad (17)$$

$$\int_0^{t_1} K\{Pf(t)\}f(t)dt \geq -Kf^2(0)/2 \quad (18)$$

where, f(t) is an aribtrary function.

Using the inequality, the following expression is obtained.

$$\psi(\Delta e) = K\Delta e\hat{\lambda}d^e_{r0} \quad (19)$$

Thus the inequality (17) will be satisfied. As the result, the rotor speed identification algorithm is given by initializing the linearized amount as follows:

$$\hat{\omega}_r = \int_0^t Ke\hat{\lambda}d_r^e \, dt + \hat{\omega}_r(0) \quad (20)$$

$$= \int_0^t K\{(\omega - p\hat{\omega}_r)(\lambda'd_r^e - \hat{\lambda}'d_r^e) +$$

$$(p + R_r/L_r)(\lambda'q_r^e - \hat{\lambda}'q_r^e)\} \times \hat{\lambda}d_r^e dt + \hat{\omega}_r(0)$$

Rotation angular velocity estimate device 37 computes $\omega_r$ based on expression (20) and outputs the results multiplied by the pole pair number p.

Further the slip frequency of the induction motor 1 is assumed by the expression (21).

$$p\hat{\omega}_s = \frac{MR_r/L_r}{\hat{\lambda}d_r^e} iq_s^e \quad (21)$$

The magnetic flux/slip frequency estimate circuit 35 executes expressions (10) and (21) to output $\lambda d^e_r$ and $p\hat{\omega}_s$. $p\hat{\omega}_r$ and $p\hat{\omega}_s$ are added by the adder 38 and a primary angular frequency $\omega$ is outputted.

Figure 6:
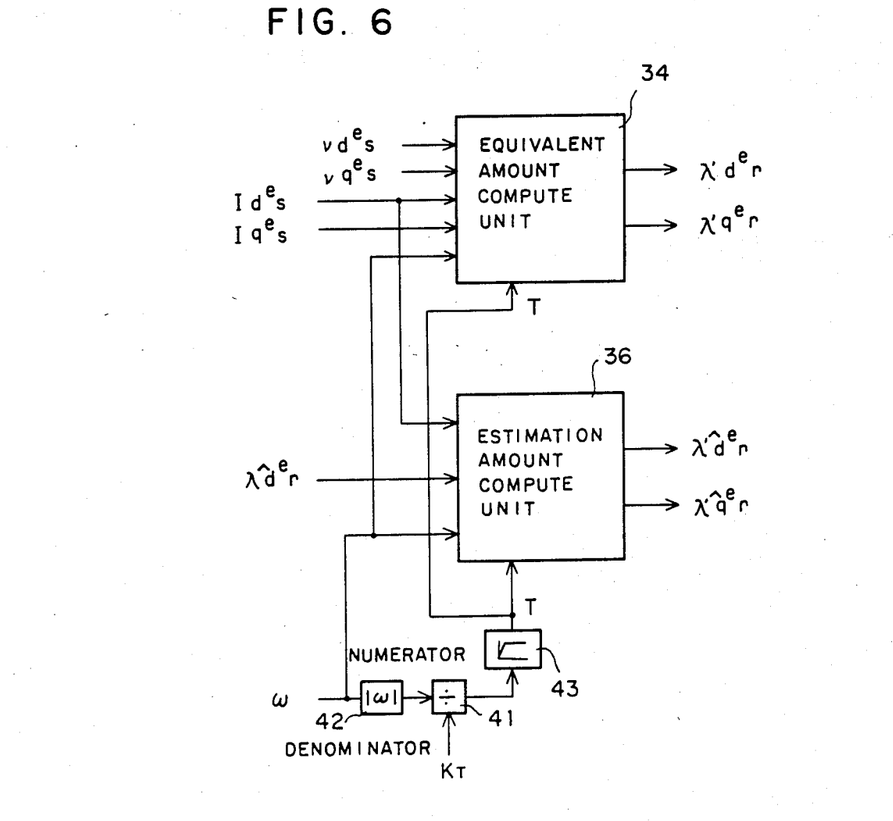
FIG. 6 is a block connection diagram depicting another embodiment according to the present invention.

FIG. 6 is an explanatory diagram of a second embodiment of the second invention. In FIG. 3, reference numeral 41 shows a division device to determine a time constant of a first order lag/element of equivalent and estimate amount compute units 34,36. Reference numeral 42 designates an absolute value compute unit to compute an absolute value of $\omega$.

Figure 7:
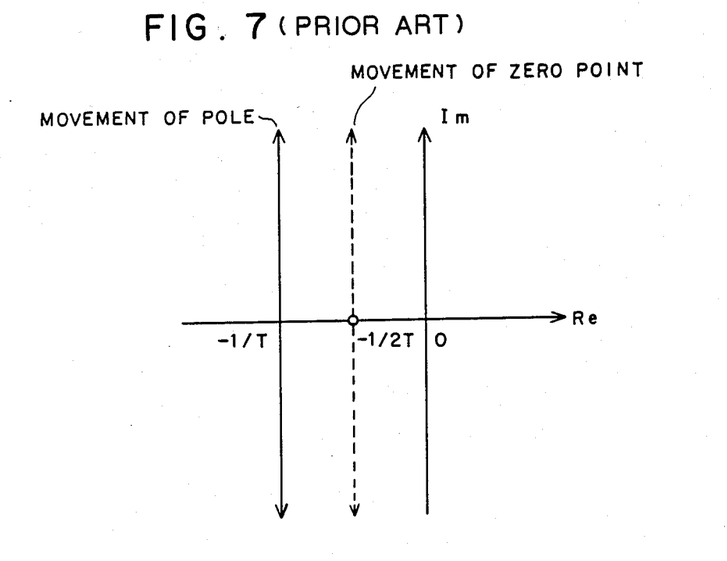
FIG. 7 is a graph showing a characteristic of the conventional speed detector.
Figure 8:
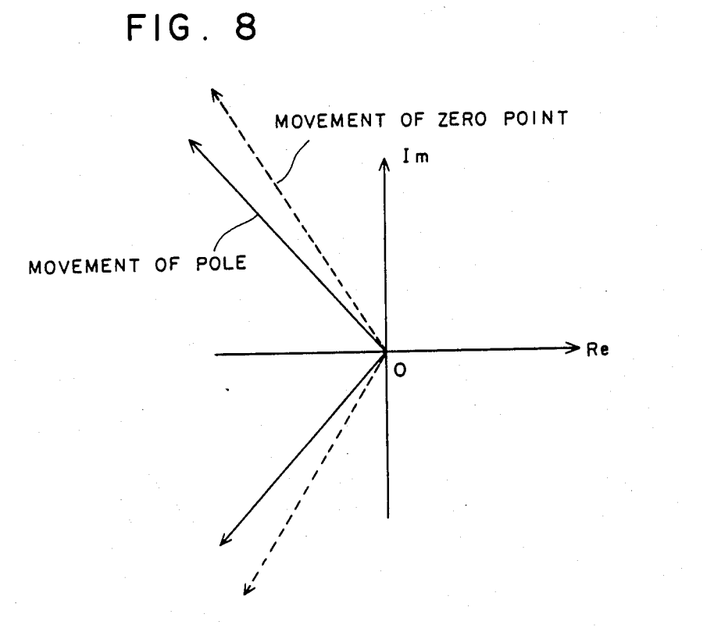
FIG. 8 is a graph showing a characteristic of a speed detector according to another embodiment of the present invention.

The motor speed estimation error can be detected by use of $\Delta e$ of the expression (16). The frequency characteristic of $\Delta e$ greatly varies depending on the primary angular frequency $\omega_0$. The pole and the zero point of the expression (16) are attained as $-(1/T)\pm j|\omega_0|$ and $-(\frac{1}{2}T)\pm j\sqrt{\omega_0^2-\frac{1}{4}T^2}$, respectively. The real root thereof relates to T, whereas the imaginary root concerns $\omega_0$ and T; consequently, as shown in FIG. 7, the damping of the system becomes poor when T is constant and $|\omega_0|$ is great. In this situation, for $T=K_T/|\omega_0|$, the pole and the zero point are respectively represented as $-(|\omega_0|/K_T)\pm j|\omega_0|$ and $-(|\omega_0|/2K_T)\pm j|\omega_0|\sqrt{1-\frac{1}{4}K_T^2}$. That is, as shown in FIG. 8, even when $\omega_0$ is changed, for the pole and the zero point, the angle with respect to the origin is not changed in the S plane, which prevents the damping from being changed. In consequence, by varying the time constant T of the delay of first order in inverse proportion to $|\omega_0|$, there is attained an effect that the speed identification characteristic is substantially kept unchanged regardless of the high speed and the low speed. The time constant T is controlled according to the expression $T=KT|\omega|$ which is given by initializing the linearized amount. In addition, since T becomes to be extremely great in the proximity of $\omega_0 \approx 0$, and the operation above cannot be readily achieved. In this case, T is fixed to a constant value.

Incidentally, in the embodiments of FIGS. 4 and 6, the primary voltage is measured for the utilization thereof; however, the values of $\lambda'd^e_r$ and $\lambda'q^e_r$ may be computed by use of an output voltage from a search coil. In such a case, the voltage drop related to the primary resistance need not be considered, and hence the compute unit 34 can be simplified. In addition, the identification error due to the resistance setting error can be prevented.

Figure 9:
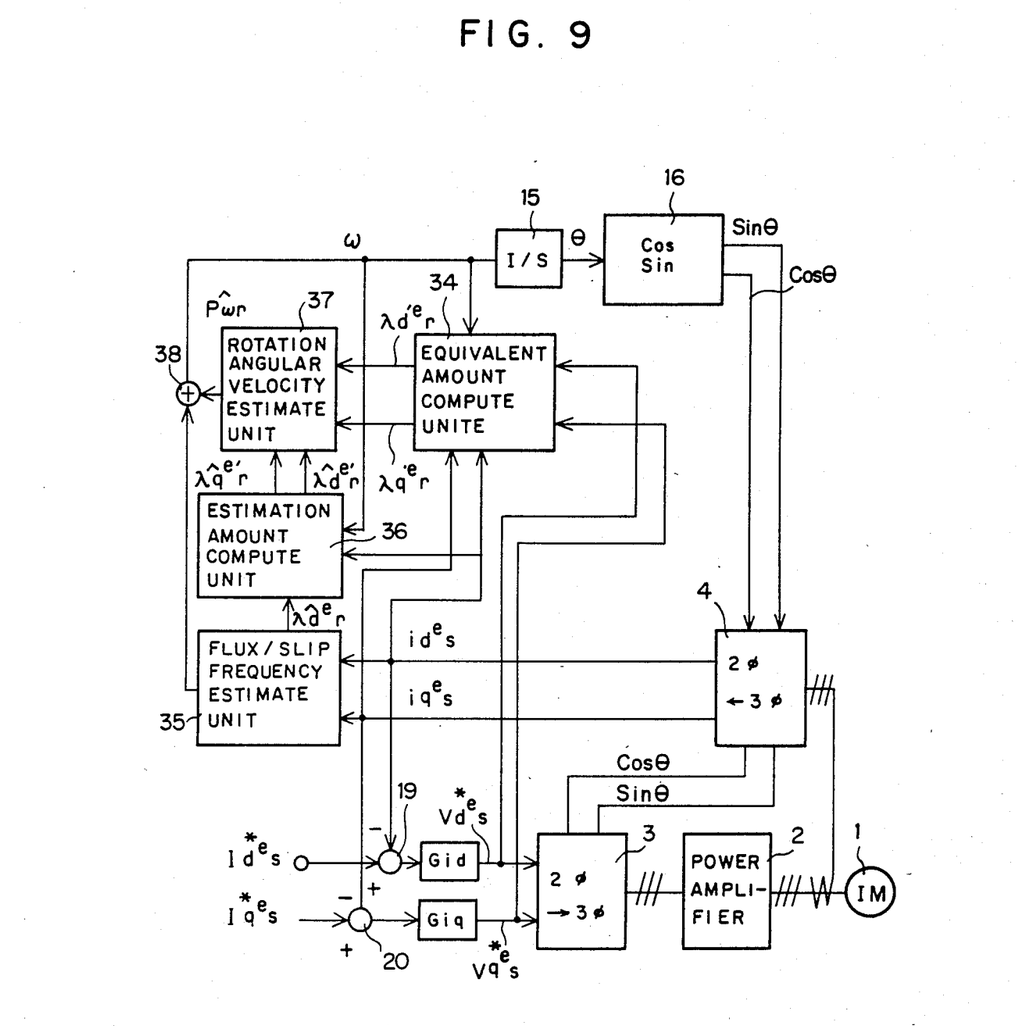
FIGS. 9 and 10 are block connection diagrams respectively showing variations of the embodiments above.

Furthermore, the primary voltage detection values of the embodiments of FIGS. 4 and 6 may be supplied by use of the voltage instruction values $Vd^e_s{}^*$ and $Vq^e_s{}^*$. In such a case, the primary voltage detector and the coordinate converter are not necessary, which leads to an effect that the system configuration is simplified. This configuration is shown in FIG. 9.

Futhermore, the current detection value inputs of the equivalent amount compute unit 34 and the flux/slip frequency estimate circuit 35 may also be replaced by current instruction values.

In addition, the equivalent amount compute unit 34 effects the computation of the expression (9) in the description above; however, when the transition characteristic is not to be severely controlled depending on purposes, the differentiation term $P\sigma L_s$ may possibly be neglected.

Moreover, for the selection of $\psi(\Delta e)$ in the expression (17), since the value of $\lambda \hat{d}^e_{r0}$ is kept to be positive in ordinary cases, the expression (19) may be substituted with the following expression (22).

$$\psi(\Delta e)=K\Delta e \qquad (22)$$

In this situation, the identification rule is expressed as follows.

$$\hat{\omega}_r = \int_0^t K\{(\omega - p\hat{\omega}_r)(\lambda'd_r^e - \lambda^2 d_r^e) + (p + R_r/L_r)(\lambda'q_r^e - \lambda^2 q_r^e)\}dt + \hat{\omega}_r(0) \qquad (23)$$

As a result, there is attained an effect that the constitution of the rotation angular velocity estimate unit 37 is simplified.

Figure 10:
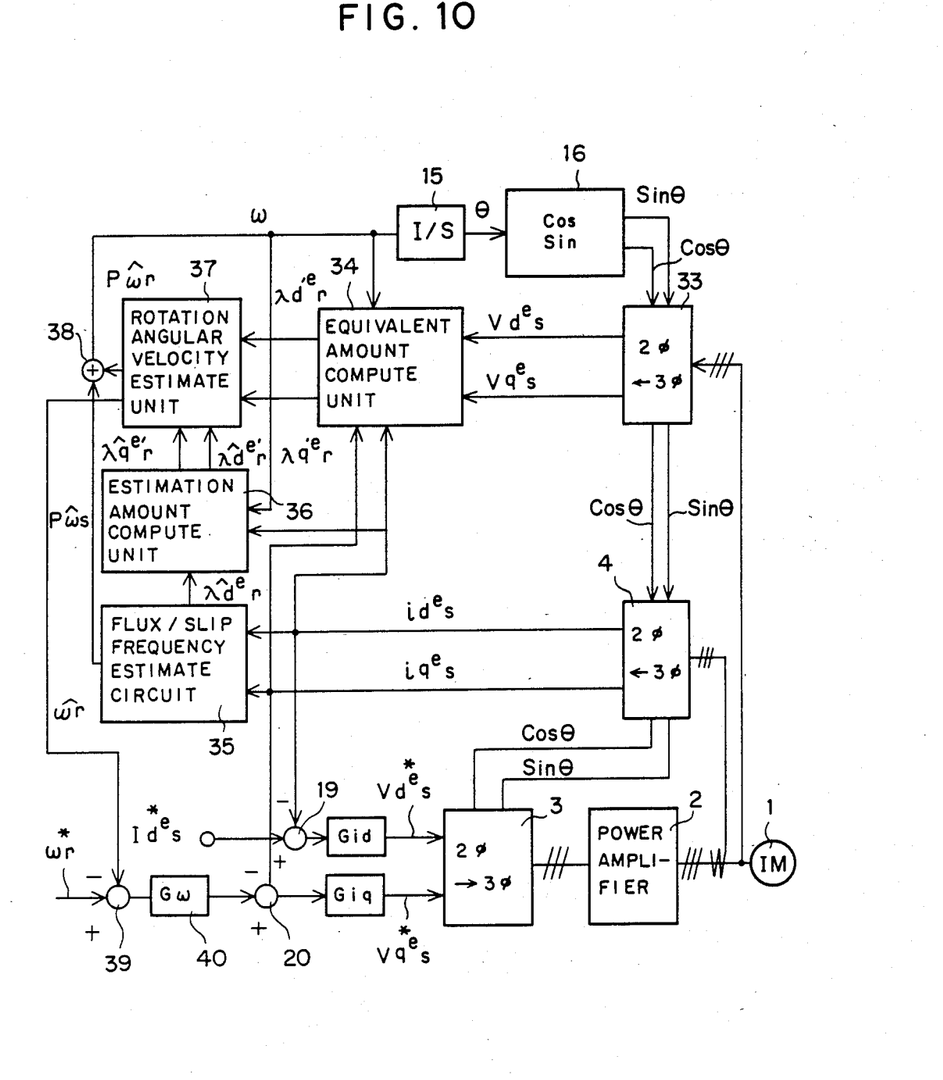

In addition, FIG. 10 is a block diagram showing a variation of the embodiment according to the present invention. In this configuration, the estimated value $\omega_r$ of the rotation angular velocity is compared with the velocity instruction value by the subtractor 39 so as to obtain a $q^e$ axis current instruction $iq^e s^*$ through the PI compensator 40. This configuration leads to an effect that the speed control of the induction motor can be accomplished without using a mechanical speed detector.

Furthermore, in the embodiment above, $T=K_T|\omega_0|$ is assumed; however, $\omega_0$ may be replaced with $p\omega_r$. In this case, although there appears a slight difference, almost the same effect is attained.

According to the present invention as described above, the secondary interlinkage flux estimation amount is converted into the estimated value of the secondary interlinkage flux equivalent amount by use of the estimate unit, and then an estimated amount of the rotation angular velocity is obtained by the rotation angular velocity estimate unit so as to be added to the slip frequency, thereby obtaining the primary angular frequency, which as a result leads to an effect that there is implemented an induction motor controller which operates without speed estimation error even in a low-speed range.

In addition, according to the present invention, since the time constant developed by the component of lag of first order associated with the equivalent amount compute unit and the estimation amount compute unit is varied depending on the primary angular frequency $\omega_0$, the transition characteristic of the speed estimation is substantially fixed regardless of the high-speed and low-speed operations, which leads to an effect that there is attained a speed estimate unit having a satisfactory damping characteristic.

What is claimed is:

1. An induction motor controller comprising:
   a power supply unit connected to an input of a three phase induction motor for supplying a controlled alternating current power to said induction motor;
   a first coordinate converter for converting a three phase excitation current of said motor into two orthogonal excitation current components;
   a flux/slip frequency estimate circuit coupled to said first coordinate converter for developing a slip frequency estimation value and a secondary interlinkage flux value based on said orthogonal excitation current components;
   an estimation amount compute unit for developing an estimated value of secondary interlinkage flux based on said secondary interlinkage flux value from said flux/slip frequency estimate circuit and at least one of said two orthogonal excitation current components;
   a second coordinate converter for converting a three phase voltage of said induction motor into two orthogonal voltage components;

an equivalent amount compute unit for developing a secondary interlinkage flux equivalent amount based on said orthogonal voltage components and said orthogonal excitation current components;

a rotation angular velocity estimate unit for developing an estimated amount of the rotation angular velocity of said induction motor based on said estimated value of secondary interlinkage flux and said secondary interlinkage flux equivalent amount;

an adder for adding said estimated amount of rotation angular velocity and said slip frequency estimation value to obtain a primary angular frequency of said induction motor; and means for controlling the alternating current power supplied by said power supply unit based upon said primary angular frequency.

2. An induction motor controller according to claim 1 further including a speed control circuit for comparing said estimated amount output from said rotation angular velocity estimate unit with rotation angular velocity instruction value so as to generate an instruction value of a current component associated with a torque by using a difference therebetween as an input.

3. An induction motor controller comprising:
a power supply unit connected to an input of a three phase induction motor for supplying a controlled alternating current power to said induction motor;

a first coordinate converter for converting a three phase excitation current of said motor into two orthogonal excitation current components;

a flux/slip frequency estimate circuit coupled to said first coordinate converter for developing a slip frequency estimation value and a secondary interlinkage flux value based on said orthogonal excitation current components;

an estimation amount compute unit for developing an estimated value of secondary interlinkage flux based on said secondary interlinkage flux value from said flux/slip frequency estimate circuit and at least one of said two orthogonal excitation current components; an equivalent amount compute unit for developing a secondary interlinkage flux equivalent amount based on a voltage instruction value and said orthogonal excitation current components;

a rotation angular velocity estimate unit for developing an estimated amount of the rotation angular velocity of said induction motor based on said estimated value of secondary interlinkage flux and said secondary interlinkage flux equivalent amount;

an adder for adding said estimated amount of rotation angular velocity and said slip frequency estimation value to obtain a primary angular frequency of said induction motor; and means for controlling the alternating current power supplied by said power supply unit based upon said primary angular frequency.

4. An induction motor controller comprising:
a power supply unit connected to an input of a three phase induction motor for supplying a controlled alternating current power to said induction motor;

a first coordinate converter for converting a three phase excitation current of said motor into two orthogonal excitation current components;

a flux/slip frequency estimate circuit coupled to said first coordinate converter for developing a slip frequency estimation value and a secondary interlinkage flux value based on said orthogonal excitation current components;

an estimation amount compute unit for developing an estimated value of secondary interlinkage flux based on said secondary interlinkage flux value from said flux/slip frequency estimate circuit and at least one of said two orthogonal excitation current components;

a second coordinate converter for converting a three phase voltage of said induction motor into two orthogonal voltage components;

an equivalent amount compute unit for developing a secondary interlinkage flux equivalent amount based on said orthogonal voltage components and a primary current instruction value;

a rotation angular velocity estimate unit for developing an estimated amount of the rotation angular velocity of said induction motor based on said estimated value of secondary interlinkage flux and said secondary interlinkage flux equivalent amount;

an adder for adding said estimated amount of rotation angular velocity and said slip frequency estimation value to obtain a primary angular frequency of said induction motor; and means for controlling the alternating current power supplied by said power supply unit based upon said primary angular frequency.

* * * * *

UNITED STATES PATENT AND TRADEMARK OFFICE
CERTIFICATE OF CORRECTION

PATENT NO. : 4,885,520

DATED : December 5, 1989

INVENTOR(S) : Hidehiko Sugimoto et al.

It is certified that error appears in the above-identified patent and that said Letters Patent is hereby corrected as shown below:

Column 1, lines 51 and 52, "P" (both occurrences) should be --p--.

Column 5, line 24, "$p(\Delta\hat{w}_r - \Delta w_r)$" should be --$p(\Delta w_r - \Delta\hat{w}_r)$--;
line 29, "wr" should be --$\hat{w}r$--;
line 42, "recieving" should be --receiving--.

Column 6, line 13, "$d_r^e$" (both occurrences) should be --$d^e_r$--;
line 15, "$q_r^e$" (both occurrences) should be --$q^e_r$--;
line 47, "$d_r^e$" should be --$d^e_r$--;
line 50, "$d_r^e$" (both occurrences) should be --$d^e_r$--;
line 52, "$q_r^e$" (both occurrences) should be --$q^e_r$--;
line 52, "$d_r^e$" should be --$d^e_r$--;
line 60, "$d_r^e$" should be --$d^e_r$--;
line 60, "$q_s^e$" should be --$q^e_s$--;
line 68, "second" should be --present--;
line 68, "FIG. 3" should be --FIG. 6--.

Column 8, line 4, "$d_r^e$" (both occurrences) should be --$d_e^r$--;
line 5, "$q_r^e$" should be --$q_e^r$--.

Signed and Sealed this

Fourth Day of August, 1992

*Attest:*

DOUGLAS B. COMER

*Attesting Officer*   *Acting Commissioner of Patents and Trademarks*